United States Patent
Shindo et al.

(10) Patent No.: US 6,837,370 B2
(45) Date of Patent: Jan. 4, 2005

(54) DISC CASE

(75) Inventors: Yoichi Shindo, Tokyo (JP); Seiichi Nishikata, Sanjo (JP)

(73) Assignee: Nexus Co., Tokyo (JP)

( * ) Notice: Subject to any disclaimer, the term of this patent is extended or adjusted under 35 U.S.C. 154(b) by 115 days.

(21) Appl. No.: 09/953,996

(22) Filed: Sep. 17, 2001

(65) Prior Publication Data

US 2002/0033349 A1 Mar. 21, 2002

(30) Foreign Application Priority Data

Sep. 19, 2000 (JP) ........................................ 2000-284071

(51) Int. Cl.⁷ ............................................. B65D 85/57
(52) U.S. Cl. .................................................. 206/308.1
(58) Field of Search ....................... 206/308.1, 309–312

(56) References Cited

U.S. PATENT DOCUMENTS

| | | | |
|---|---|---|---|
| 4,722,439 A | * | 2/1988 | Grobecker et al. ...... 206/308.1 |
| 4,850,731 A | | 7/1989 | Youngs |
| 5,253,751 A | | 10/1993 | Wipper |
| 5,284,243 A | * | 2/1994 | Gelardi et al. ........... 206/308.1 |
| 5,289,918 A | * | 3/1994 | Dobias et al. ........... 206/308.1 |
| 5,533,615 A | | 7/1996 | McCamy |
| 5,704,474 A | | 1/1998 | Oland |
| 5,730,283 A | | 3/1998 | Lax |
| 5,788,069 A | * | 8/1998 | Calhoun et al. ......... 206/308.1 |
| 6,077,583 A | | 6/2000 | Park |

FOREIGN PATENT DOCUMENTS

| | | |
|---|---|---|
| EP | 0252226 | 1/1988 |
| EP | 1014374 | 6/2000 |
| FR | 2729248 | 7/1996 |
| JP | 10106203 | 4/1998 |
| JP | 2814489 | 8/1998 |
| JP | 10310184 | 11/1998 |
| KR | 9324313 | 11/1993 |

* cited by examiner

*Primary Examiner*—Mickey Yu
*Assistant Examiner*—J. Gregory Pickett
(74) *Attorney, Agent, or Firm*—Volpe and Koenig, P.C.

(57) ABSTRACT

A recess is formed in a tray of a disc case. A peripheral wall portion of the recess is formed having disc supporting portions that support a disc in a manner such that the recording surface of the disc is floating. Spring elements are arranged along slots that are formed in the peripheral wall portion. Each spring element is formed having a protuberance and a guide surface. As the disc is inserted into the recess, the spring elements bend with their respective guide surfaces touched by an outer peripheral portion of the disc. The outer peripheral portion of the disc moves into the space inside the protuberances of the spring elements. When the disc is in the recess, the protuberances prevent the disc from slipping out of the recess.

14 Claims, 9 Drawing Sheets

DISC CASE

CROSS-REFERENCE TO RELATED APPLICATIONS

This application is based upon and claims the benefit of priority from the prior Japanese Patent Application No. 2000-284071, filed Sep. 19, 2000, the entire contents of which are incorporated herein by reference.

BACKGROUND OF THE INVENTION

1. Field of the Invention

The present invention relates to a disc case used to store media discs, such as compact discs, so-called CD singles, digital versatile discs, etc.

2. Description of the Related Art

In a disc case that is conventionally used to store a media disc such as a compact disc, upper and lower plastic cases are swingably coupled to each other by means of hinge pivots, in general. A circular boss (center boss) is formed in the center of the lower case of the conventional disc case of this type. The disc is held in a manner such that its recording surface is floating as its center hole is fitted on the center boss.

Disc cases that are used to store discs containing musical pieces, literature, etc. require peculiar, beautiful designs that distinguish those disc contents from others. If the center boss is formed on the base plate, as in the conventional disc case, however, it inevitably restricts the case design.

Possibly, a flat base plate without a center boss may be used for the purpose. In this case, however, a protective sheet such as a nonwoven fabric must be used to protect the recording surface of a disc. Thus, the number of indispensable components increases, and besides, the protective sheet spoils the beautiful appearance of the expressly designed base plate.

A proposed example of a disc case without a center boss is formed having an opening in a side face of its tray. A disc can be loaded into and unloaded from this disc case through the opening in the lateral direction of the tray. Conventional automatic disc loaders are designed so that they can insert the disc into the tray that is held horizontal from above the tray (in the thickness direction of the tray). Thus, the existing automatic disc loaders cannot be applied to disc cases that require the disc to be inserted in the lateral direction of the tray.

BRIEF SUMMARY OF THE INVENTION

Accordingly, the object of the present invention is to provide a disc case capable of holding a disc in a given position on a tray without using a center boss and preferably of allowing the disc to be loaded into and unloaded from the tray in the thickness direction of the disc.

A disc case according to the present invention comprises a tray having a recess to be stored with a disc, a disc supporting portion formed on a peripheral wall portion of the recess and capable of supporting the outer peripheral portion of the disc in a manner such that the recording surface of the disc is floating, and spring portions provided near the peripheral wall portion. Each of the spring portions preferably may include a protuberance movable between a projecting position in which it prevents the disc from slipping out of the recess and a position in which it allows the disc to be taken out, a spring element for urging the protuberance toward the projecting position, and a guide surface adapted to touch the outer peripheral portion of the disc, thereby bending the spring element in a direction to allow the insertion of the disc into the recess, as the disc is inserted into the recess.

When the disc case is stored with the disc, the outer peripheral portion of the disc touches the respective guide surfaces of the spring portions. As the spring elements bend, the outer peripheral of the disc moves into inside the protuberances, whereby the disc is set in the recess. The respective protuberances of the spring portions are restored to their original projecting position by means of the elastic force of the spring elements. The outer peripheral portion of the disc in the recess is supported by means of the disc supporting portion. Thus, the recording surface of the disc is slightly lifted above the base portion of the tray. Besides, the protuberances prevent the disc from slipping out of the tray.

According to the present invention, the disc can be held in a given position on the tray with its recording surface floating without using a center boss. Since the disc case of the invention uses no center boss, restrictions on the design of the base portion of the tray are reduced. Further, the disc can be inserted into the recess in its thickness direction.

According to this invention, each of the spring portions may include an arm-shaped spring element that extends along a slot in the tray and can bend around the opposite ends of the slot. In this case, the spring elements easily bend in the diametrical direction of the disc.

Preferably, according to this invention, the tray is formed having an elliptic or oval recess. In taking out the disc, in this case, the disc can be easily disengaged from the protuberances by bending the spring elements in a manner such that its position is slightly shifted in the major-axis direction of the recess.

Preferably, according to this invention, an opening is formed in a side portion of the tray. In taking out the disc from the recess, in this case, a user can push the spring elements by, for example, slightly shifting the position of the disc with his/her finger on the outer peripheral portion of the disc at the opening.

DETAILED DESCRIPTION OF THE INVENTION

A disc case 10 according to a first embodiment of the present invention will now be described with reference to FIGS. 1 to 6.

Figure 1:
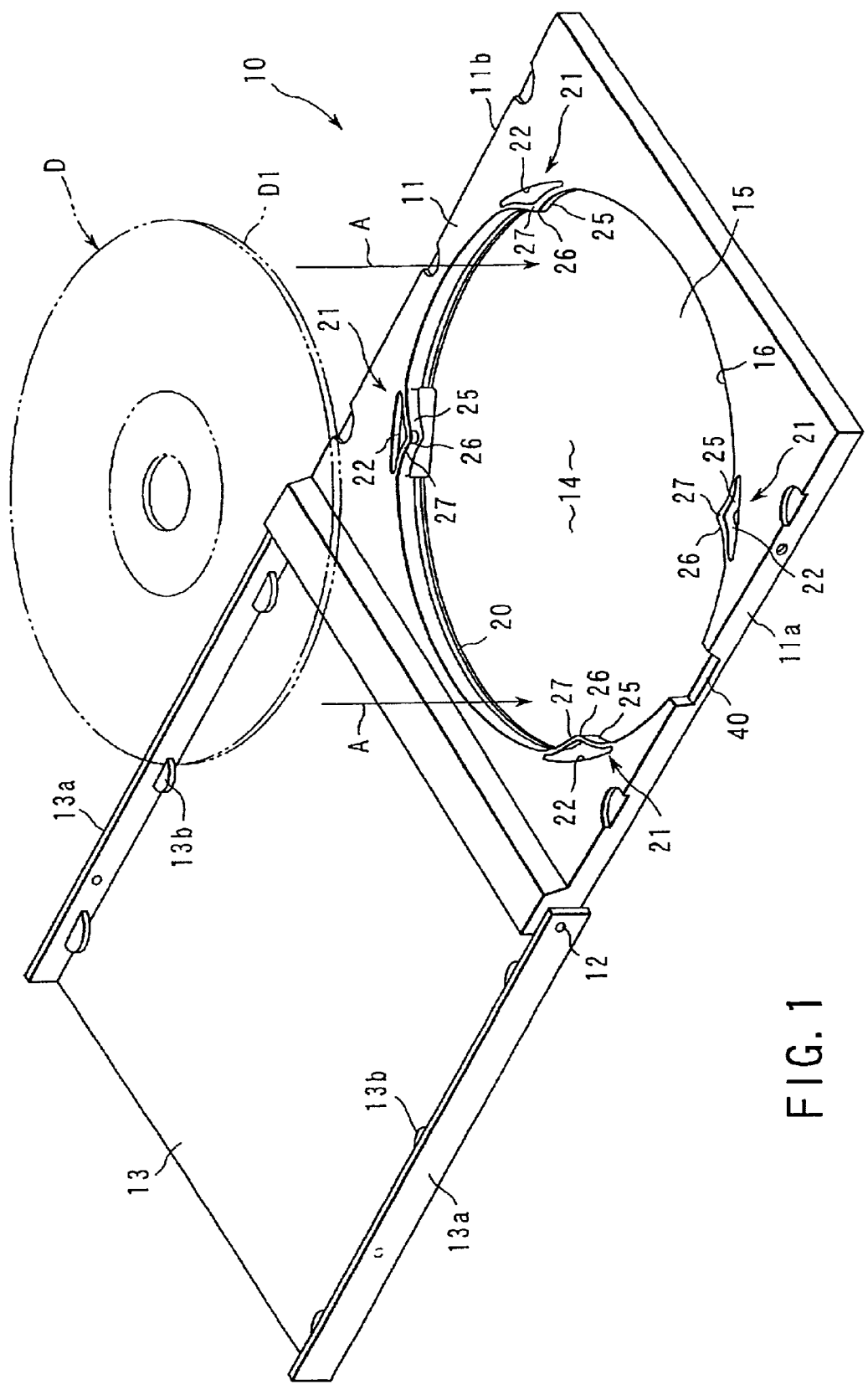
FIG. 1 is a perspective view of a disc case according to a first embodiment of the present invention.

The disc case 10 shown in FIG. 1 comprises a plastic tray 11 and a lid 13 that is swingably attached to the tray 11 by means of a hinge portion 12. The tray 11 is formed having a circular recess 14 that is shaped corresponding to the external shape of a disc D. The recess 14 includes a flat base portion 15 and a peripheral wall portion 16 around the base portion 15.

Figure 4:
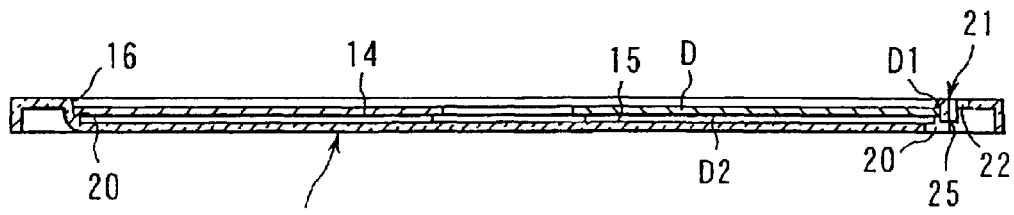
FIG. 4 is a sectional view of the tray with a disc therein, taken along line F4—F4 of FIG. 2.

Disc supporting portions 20 are formed on the peripheral wall portion 16. As shown in FIG. 4, the supporting portions 20 can carry thereon an outer peripheral portion D1 of the disc D in the recess 14 in a manner such that a recording surface D2 of the disc is floating. The supporting portions 20 are formed in a plurality of positions that are spaced in the circumferential direction of the recess 14. The supporting portions 20 may be replaced with a supporting portion that extends continuously in the circumferential direction of the recess 14.

Figure 3:
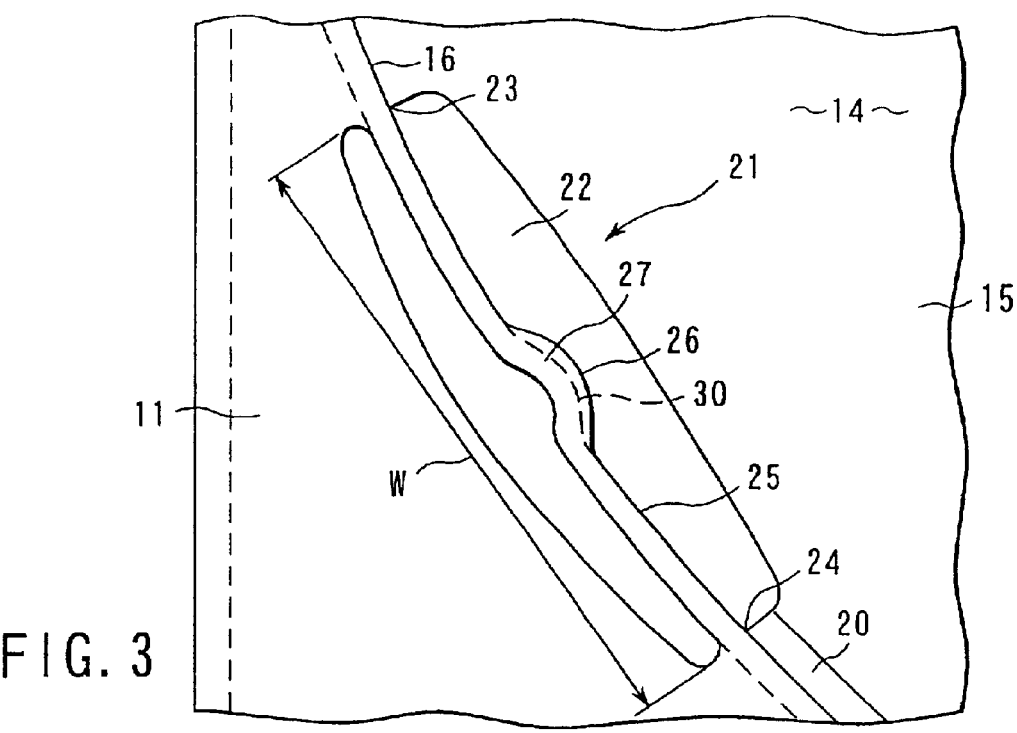
FIG. 3 is an enlarged plan view showing part of the tray shown in FIG. 2.
Figure 5:
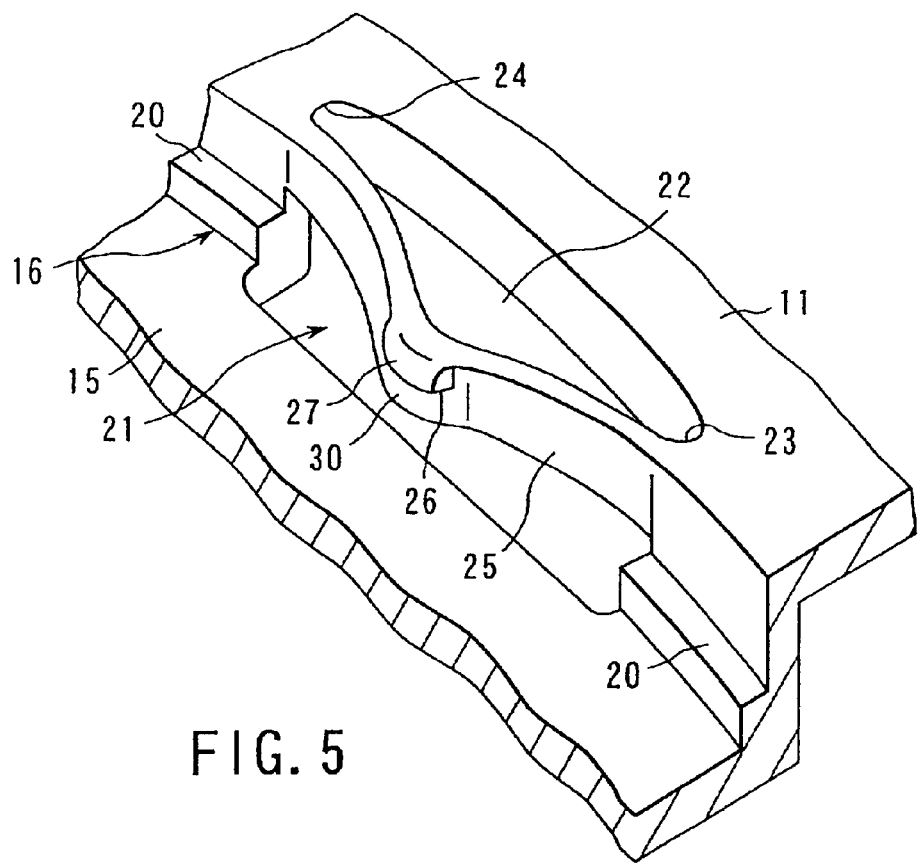
FIG. 5 is an enlarged perspective view showing part of the tray shown in FIG. 2.

Spring portions 21 are provided in a plurality of positions located close to the peripheral wall portion 16 of the recess 14 and spaced in the circumferential direction of the recess. Since the spring portions 21 have their configuration and function in common, one of them will be described representatively. As shown in FIGS. 3 and 5, the spring portion 21 has a slot 22 that extends in the circumferential direction of the recess 14 and an arm-shaped spring element 25 that extends along the slot 22 between its opposite ends 23 and 24. Further, the spring portion 21 has a protuberance 26 formed near the upper end of the middle portion of the spring element with respect to its longitudinal direction and a slanting guide surface 27 formed on the outer side of the protuberance 26.

A central portion 30 of the spring element 25 with respect to its longitudinal direction projects toward the inner part of the recess 14. The protuberance 26 is formed integrally with the central portion 30 of the spring element 25. The spring element 25 can bend in the diametrical direction of the disc D around the opposite ends 23 and 24 of the slot 22. The spring elements 25 push the outer peripheral portion D1 of the disc in the diametrical direction of the disc D, thereby the disc D is urged towards the center of the recess 14.

Figure 6:
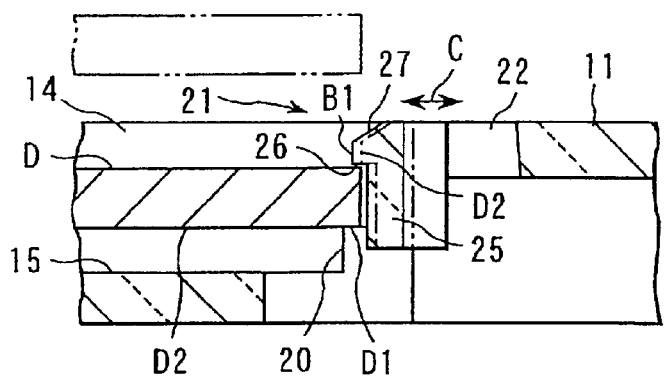
FIG. 6 is an enlarged sectional view of a spring portion shown in FIG. 4.

The protuberance 26 can move in the direction indicated by arrow C in FIG. 6. More specifically, the protuberance 26 can move between a projecting position B1 in which it prevents the disc D from slipping out of the recess 14 and a position B2 in which it allows the disc D to be taken out. The plate shaped spring element 25 urges the protuberance 26 toward the projecting position B1.

Figure 2:
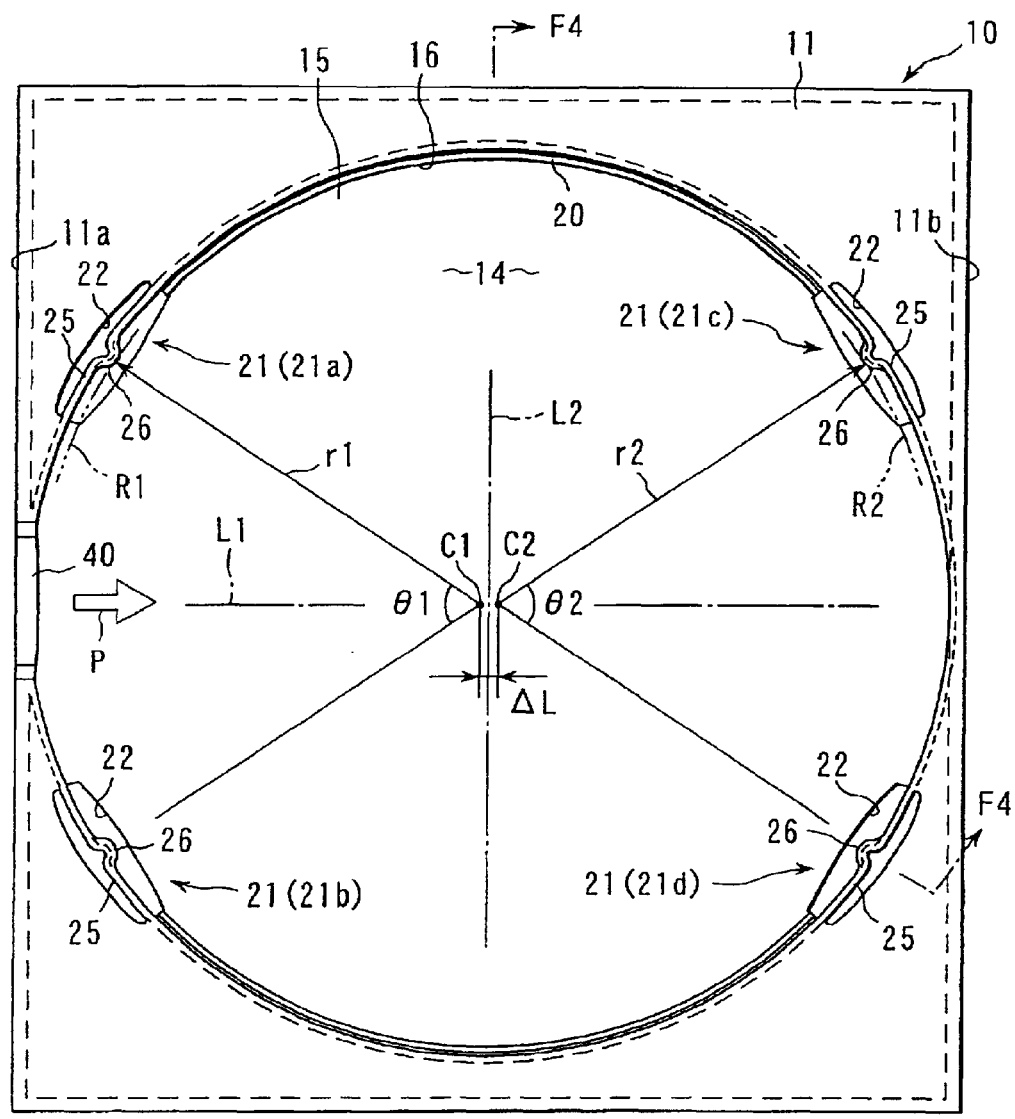
FIG. 2 is a plan view of a tray of the disc case shown in FIG. 1.

In the case of the tray 11 shown in FIG. 2, the spring portions 21 are located individually in four positions at given spaces in the circumferential direction of the peripheral wall portion 16 of the recess 14. Among the four spring portions 21, a pair of spring portions 21a and 21b that are situated nearer to one side portion 11a of the tray 11 than to the other side portion 11b adjoin each other at an angle θ1 (e.g., 60° or thereabout) narrower than 90° to each other. Another pair of spring portions 21c and 21d that are situated nearer to the object side portion 11b of the tray 11 also adjoin each other at an angle θ2 (e.g., 60° or thereabout) narrower than 90° to each other. Thus, each spring portion 21 is liable to bend in the direction indicated by a segment L1 in FIG. 2.

The plane shape of the recess 14 (taken as the tray 11 is viewed in its thickness direction) is the shape of an ellipse or oval that has its major axis extending along the segment L1 (along which each spring element 25 is liable to bend) and its minor axis extending along a segment L2 perpendicular to the segment L1. In this embodiment, the major axis is longer than the minor axis by a dimension ΔL of several millimeters.

In FIG. 2, the respective centers of circular arcs R1 and R2 that pass individually through the respective distal ends of the protuberances 26 are represented by C1 and C2, respectively. The distances (radii of curvature) from the centers C1 and C2 to the respective distal ends of the protuberances 26 are represented by r1 and r2, respectively. When the spring elements 25 are subjected to no external force (or in a free state), r1 and r2 are a little shorter than the radius of the disc D. The guide surface 27 is a slope such that it projects toward the disc D with distance from its top to the base portion 15 is increased. As the disc D is inserted into the recess 14, therefore, each spring element 25 bends in the direction to allow the insertion of the disc D with its guide surface 27 in contact with the outer peripheral portion D1 of the disc D.

The disc case 10 of this embodiment, unlike a conventional one, uses no center boss, so that its base portion 15 is substantially flat. If the tray 11 is formed of an optically transparent synthetic resin, therefore, the backside of the base portion 15 can be seen from the outside. If a beautifully designed printed surface is provided on the backside of the tray 11, moreover, the commercial value of the disc case 10 can be enhanced.

An opening 40 that opens into the recess 14 is formed in the one side portion 11a of the tray 11. The opening 40 enables a user to catch or push the outer peripheral portion D1 of the disc D with his/her finger as he/she takes out the disc D from the recess 14. As shown in FIG. 1, lugs 13b are formed inner side portions 13a of the lid 13. When the lid 13 is put on, the respective distal ends of the lugs 13b face the upper surface of the outer peripheral portion D1 of the disc D.

Figure 15:
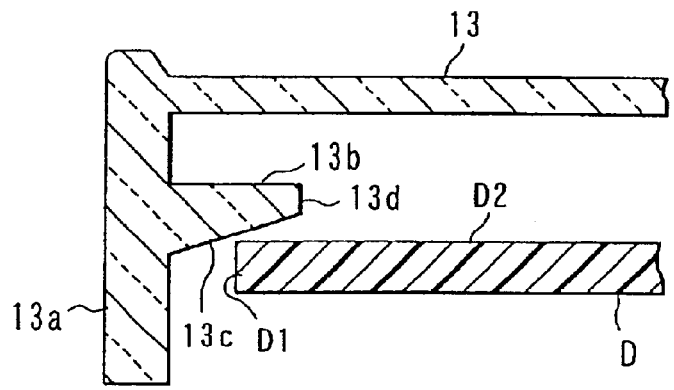
FIG. 15 is a partial sectional view of the disc case shown in FIG. 1.
Figure 16:
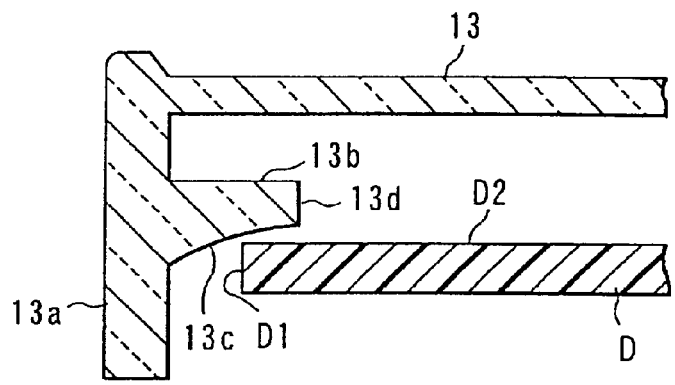
FIGS. 16, 17 and 18 are partial sectional views of disc cases having differently modified lugs, individually.
Figure 17:
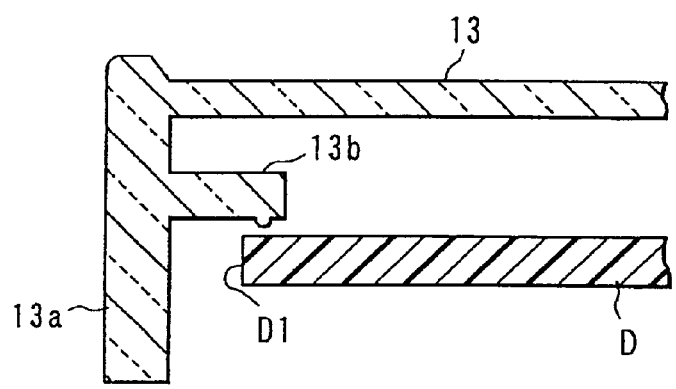
Figure 18:
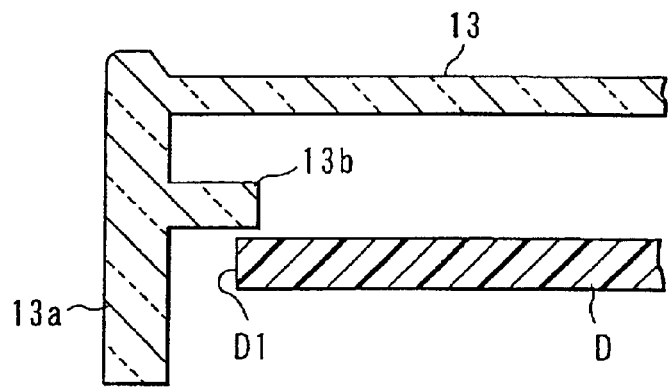

FIGS. 15 to 18 individually show examples of the shape of each lug 13b. The lugs 13b shown in FIGS. 15 and 16 are reduced in thickness or tapered toward their respective distal ends 13d so that they have their respective slopes 13c on the underside. Usually, respective slopes 13c are slightly apart from the edge of the outer peripheral portion D1 of the disc. When the disc D is moved toward the lugs 13b by shock or the like, the lugs 13b touch only the edge of the outer peripheral portion D1 of the disc. Accordingly, if the disc D is turned upside down and the recording surface D2 of the disc faces on the lugs 13b, therefore, the recording surface D2 can be prevented from touching the lugs 13b.

The following is a description of the operation of the disc case 10 according to this embodiment.

The disc D can be inserted into the recess 14 in the thickness direction of the tray 11 (indicated by arrows A in FIG. 1). When the outer peripheral portion D1 of the disc D touches the respective guide surfaces 27 of the spring portions 21 as the disc D is inserted into the recess 14, the spring elements 25 bend so that the outer peripheral portion D1 of the disc D get inside the protuberances 26.

Thus, the disc D is held in the recess 14, and the protuberances 26 are returned to their original projecting position by means of the elastic restoring force of the spring elements 25. The outer peripheral portion D1 of the disc D in the recess 14 is supported by means of the disc supporting portions 20. The recording surface D2 of the disc D is slightly lifted above the base portion 15 of the tray 11. Besides, the protuberances 26 prevent the disc D from slipping out of the tray 11. When the lid 13 is closed, the respective distal ends of the lugs 13b face the outer peripheral portion D1 of the disc D. If a shock acts on the disc case 10, therefore, the lugs 13b can further effectively restrain the disc D from slipping out of the recess 14.

The disc case 10 is designed so that the disc D can be inserted into the recess 14 in its thickness direction from above. Thus, an automatic loader that has been used in disc loading operation for conventional disc cases (cases with a center boss) can be used without modification. In this automatic loader, the disc D is kept horizontal by means of a vacuum suction mechanism or the like. The disc D can be set in the recess 14 by being simply inserted into the recess 14 from above the tray 11.

The disc case 10 is provided with the spring elements 25 or plate springs that extend along the slots 22 in the tray 11. Therefore, each spring element 25 can enjoy so long an overall length W (shown in FIG. 3) that it easily bends in the diametrical direction of the disc D. Further, the flexibility of each spring element 25 can be adjusted according to its overall length W. Thus, the spring elements 25 can be made hard to break, so that their durability can be improved.

The transparent resin for the tray 11, e.g., polystyrene, ABS resin, or polyvinyl chloride, etc. that is doped with no softener, is harder than a resin that is doped with a softener. As described above, the spring elements 25 of the disc case 10 can be made flexible, so that their durability can be improved despite the use of the relatively hard resin as the material of the tray 11. However, the material of the tray 11 may be selected freely, and an opaque resin may be used for the purpose.

In taking out the disc D from the recess 14 of the disc case 10, the spring portions 21c and 21d can be bent by pressing the disc D in the major-axis direction of the recess 14 (indicated by arrow P in FIG. 2). By doing this, the outer peripheral portion D1 of the disc D can be easily removed from the respective protuberances 26 of the spring portions 21a and 21b that are situated near the opening 40.

If the recess 14 has the shape of a perfect circle, a substantial gap is inevitably created between the outer peripheral portion D1 of the disc D and the peripheral wall portion 16 throughout the circumference of the disc D when the spring portions 21c and 21d are allowed to bend in the direction of arrow P in FIG. 2. This gap causes the disc D to shake in the recess 14. According to this embodiment, however, the recess 14 is in the shape of a moderate ellipse or oval, so that the spring elements 25 can fully bend in the direction of the major axis (segment L1) of the recess 14. The disc D can be prevented from moving in the direction of the miner axis (segment L2) of the recess 14. Thus, the disc D can be restrained from shaking in the recess 14. Further, the disc D can be easily disengaged from the protuberances 26 as it is taken out of the recess 14.

The side portion 11a of the tray 11 of this embodiment is formed having the opening 40 on the major axis (segment L1). In taking out the disc D from the recess 14, the user softly pushes the disc D in the direction of arrow P with his/her finger on the outer peripheral portion D1 of the disc D at the opening 40. By doing this, the spring portions 21c and 21d can be bent in the direction of arrow P, and the disc D can be easily disengaged from the respective protuberances 26 of the spring portions 21a and 21b.

Figure 7:
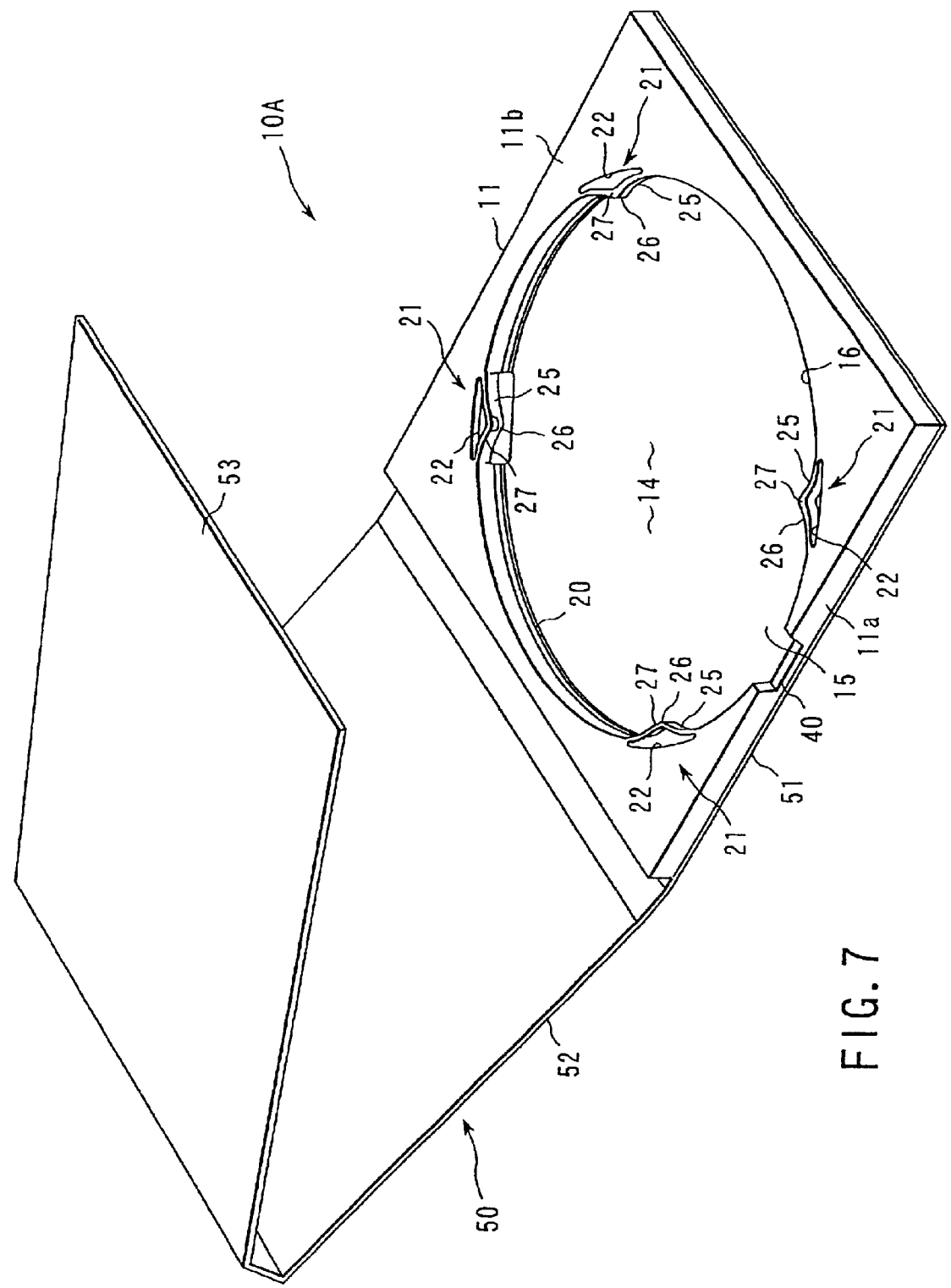
FIG. 7 is a perspective view of a disc case according to a second embodiment of the invention.

FIG. 7 shows a disc case 10A according to a second embodiment of the invention. The disc case 10A of this embodiment comprises a tray 11 and a folding cover member 50 of cardboard. An example of the cover member 50 includes a mount portion 51 fixed to the second surface of a base portion 15 of the tray 11, a first cover portion 52 covering the first surface side of the tray 11, a second cover portion 53 capable of being put on the second surface side of the mount portion 51, etc. Since the basic configuration, function, and effect of the tray 11 of the second embodiment are the same as those of the tray 11 of the first embodiment, the common numeral is used to designate the two trays, and a description of the tray 11 of the second embodiment is omitted. The cover member 50 may alternatively be formed of a synthetic resin.

In the disc case 10A of the second embodiment, patterns of desired designs can be beautifully printed on the cover member 50 by using an existing printing technique. If an optically transparent synthetic resin is used for the tray 11, the printed surface of the mount portion 51 can be seen through the base portion 15. The disc case 10A, unlike a conventional one, uses no center boss, so that the beautiful printed surface of the mount portion 51 that is located on the under surface side of the transparent base portion 15 can be viewed clearly. Thus, the commercial value of the disc case 10A is enhanced.

The spring elements 25 are expected only to have elasticity such that they can be deformed by being pushed by the outer peripheral portion D1 of the disc D as the disc D is inserted into the recess 14, and that they can be restored to their original state when the disc D is held in the recess 14. In either of the foregoing embodiments, the spring elements 25 may be molded integrally with or separately from the tray 11.

Figure 8A:
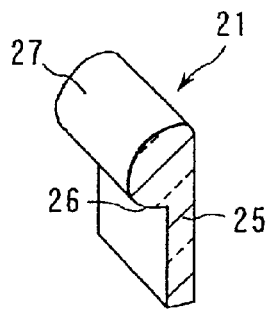
FIG. 8A is a perspective view, partially in section, showing a spring portion according to a third embodiment of the invention.
Figure 8B:
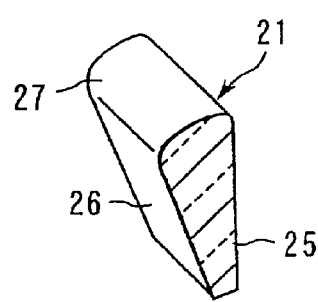
FIG. 8B is a perspective view, partially in section, showing a spring portion according to a fourth embodiment of the invention.
Figure 8C:
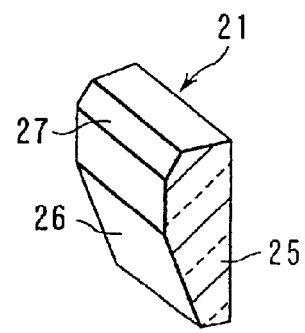
FIG. 8C is a perspective view, partially in section, showing a spring portion according to a fifth embodiment of the invention.

As in the case of a third embodiment shown in FIG. 8A, for example, the protuberance 26 and the guide surface 27 of each spring portion 21 may be formed having a continuous arcuate shape. As in a fourth embodiment shown in FIG. 8B, moreover, the protuberance 26 of each spring portion 21 may be tapered. Alternatively, as in a fifth embodiment shown in FIG. 8C, each spring element 25 may be formed having a tapered protuberance 26 and a guide surface 27. These retaining protuberances 26, like the ones according to the foregoing embodiment, are overhangs that project toward the inner part of the recess 14.

Figure 9:
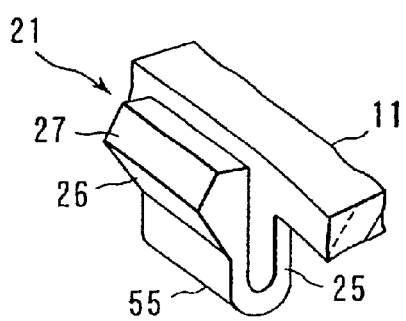
FIG. 9 is a perspective view, partially in section, showing a spring portion according to a sixth embodiment of the invention.
Figure 10:
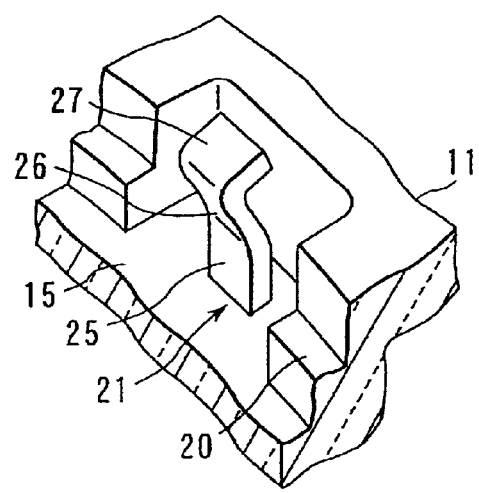
FIG. 10 is a perspective view, partially in section, showing a spring portion according to a seventh embodiment of the invention.

As in the case of a sixth embodiment shown in FIG. 9, moreover, a protuberance 26 and a guide surface 27 may be formed on the distal end portion of each spring element 25 that has a U-shaped sheet portion 55. Alternatively, as in a seventh embodiment shown in FIG. 10, a protuberance 26 and a guide surface 27 may be formed on the distal end portion of each spring element 25 that rises from the base portion 15 of the tray 11. Thus, the spring portions may be formed having various shapes.

Figure 11:
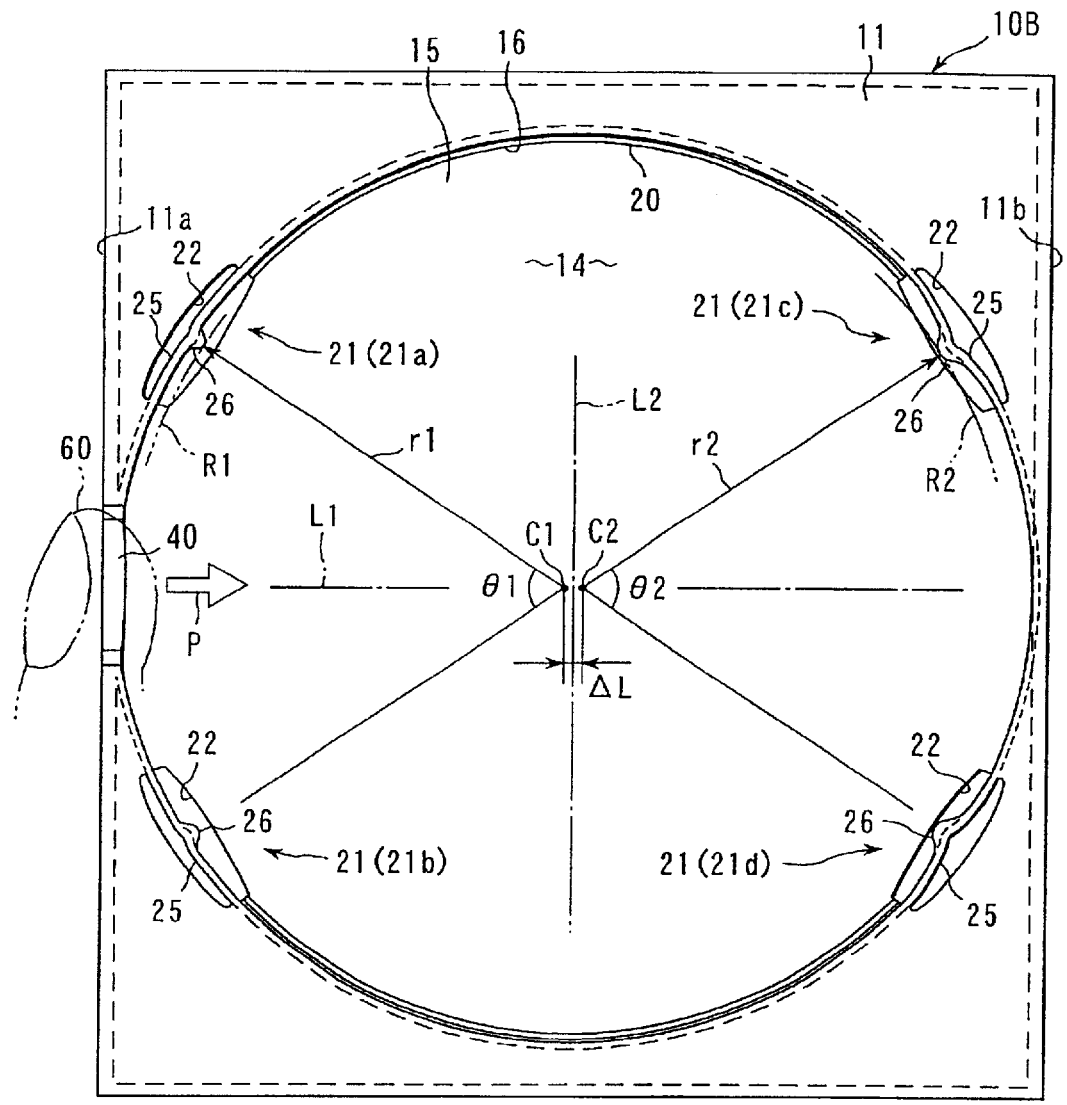
FIG. 11 is a plan view of a disc case according to an eighth embodiment of the invention.

FIG. 11 shows a disc case 10B according to an eighth embodiment of the invention. Common numerals are used to designate common portions of the disc cases 10 and 10B of the second and eighth embodiments, and a description of those portions is omitted. In the disc case 10B, spring portions 21c and 21d which are remote from an opening 40 have a shape such that they can bend deeper in the direction of the segment L1 than protuberances 26 of those spring portions 21a and 21b which are situated near the opening 40 can. Besides, the protuberances 26 of the spring portions 21c and 21d that are remote from the opening 40 are larger than the protuberances 26 of the spring portions 21a and 21b near the opening 40.

If a shock acts on the disc case 10B having these spring portions 21a to 21d, the disc cannot be easily disengaged from the spring portions 21a to 21d. In taking out the disc from the tray 11, moreover, the user can fully bend the spring portions 21c and 21d by applying force P to an end of the disc with his/her fingertip 60. Thus, the outer peripheral portion of the disc D can be easily disengaged from the protuberances 26 of the spring portions 21a and 21b that are situated near the opening 40 by bending the spring portions 21c and 21d that have a longer bending stroke.

Figure 12:
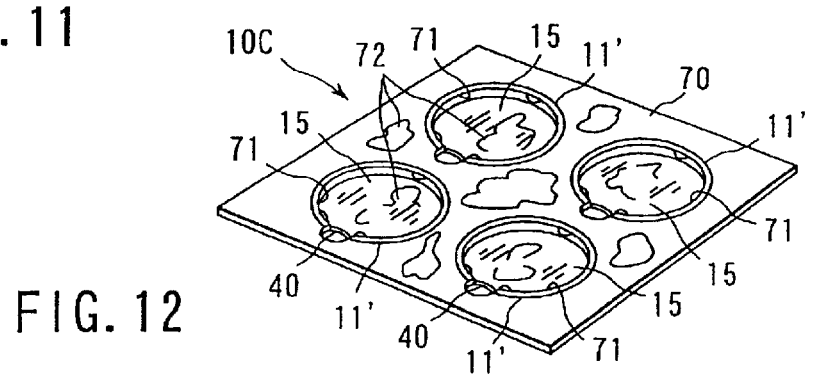
FIG. 12 is a perspective view of a disc case according to a ninth embodiment of the invention.
Figure 13:
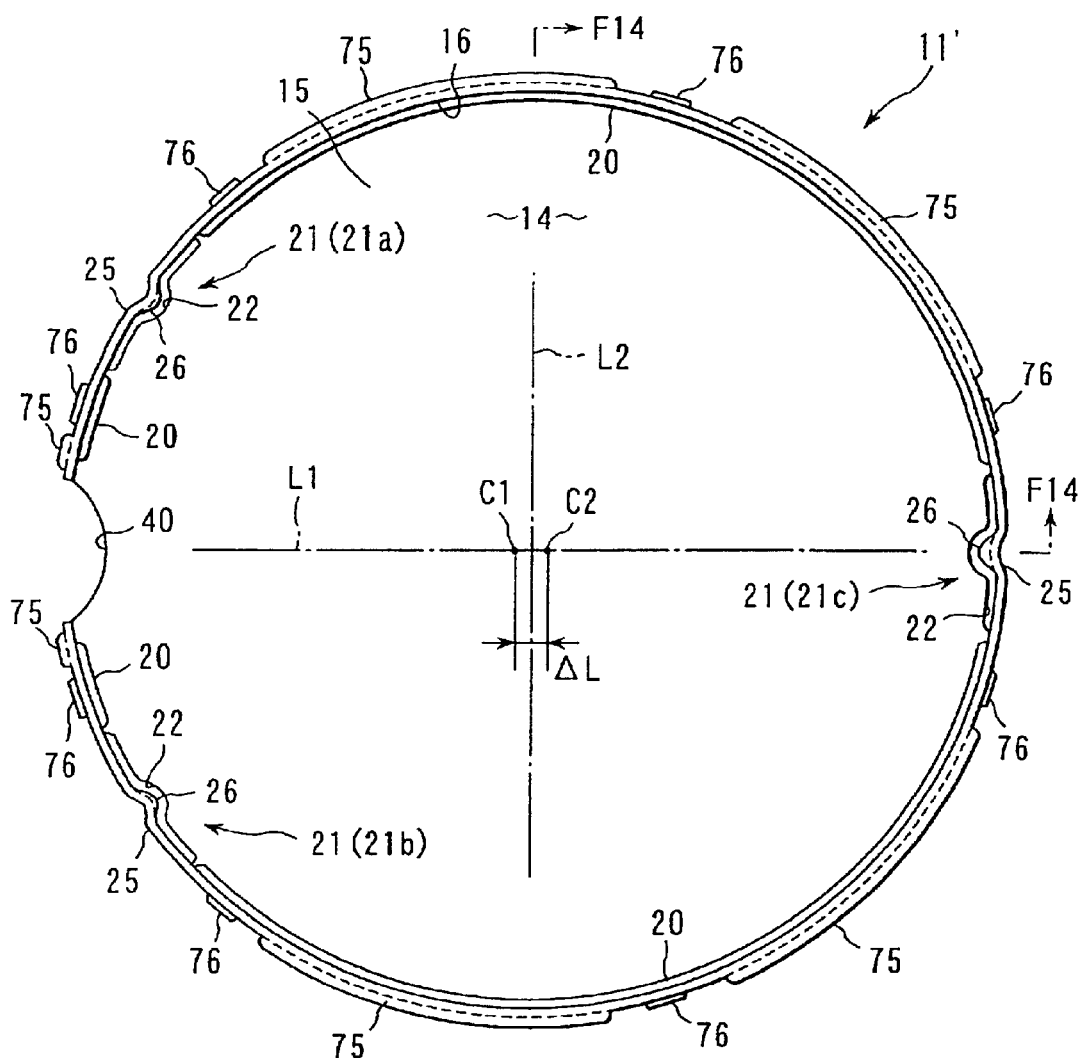
FIG. 13 is a plan view of a tray of the disc case shown in FIG. 12.
Figure 14:
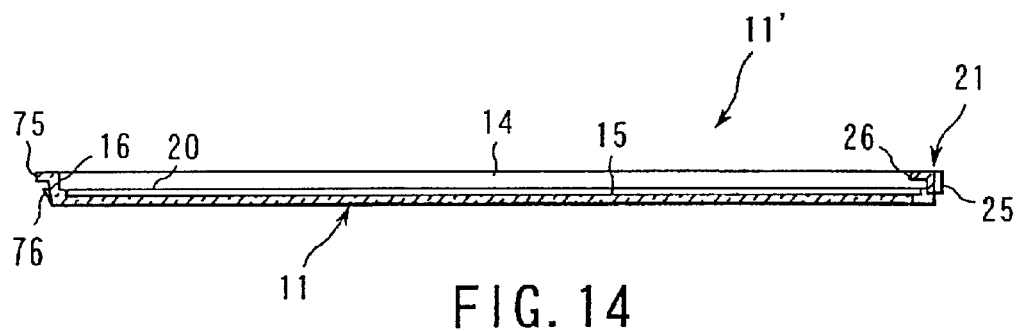
FIG. 14 is a sectional view of the tray taken along line F14—F14 of FIG. 13.

FIGS. 12 to 14 show a disc case 10C according to a ninth embodiment of the invention. As shown in FIG. 12, a plurality of circular holes 71 are formed in a base 70 that is formed of cardboard, for example. Round trays 11' are fitted in the holes 71, individually. Each tray 11' shares its basic configuration and function with the tray 11 of the disc case 10B shown in FIG. 11 except for the following particulars.

As shown in FIG. 13, spring portions 21a, 21b and 21c are formed individually in three positions on the circumference of each tray 11'. Flange portions 75 that engage the upper side of the inner peripheral surface of each hole 71 in the base 70 and retaining protuberances 76 that can catch the inner peripheral surface of the hole 71 are formed on part of the tray 11' in its circumferential direction. The tray 11', like the tray 11, is formed of an optically transparent synthetic resin. The base 70 is provided with printed surfaces 72, on which beautifully designed patterns or pictures are printed. Among these printed surfaces 72, those ones which are situated on the backside of the base portion 15 of the tray 11' can be externally seen through the transparent base portion 15.

Figure 19:
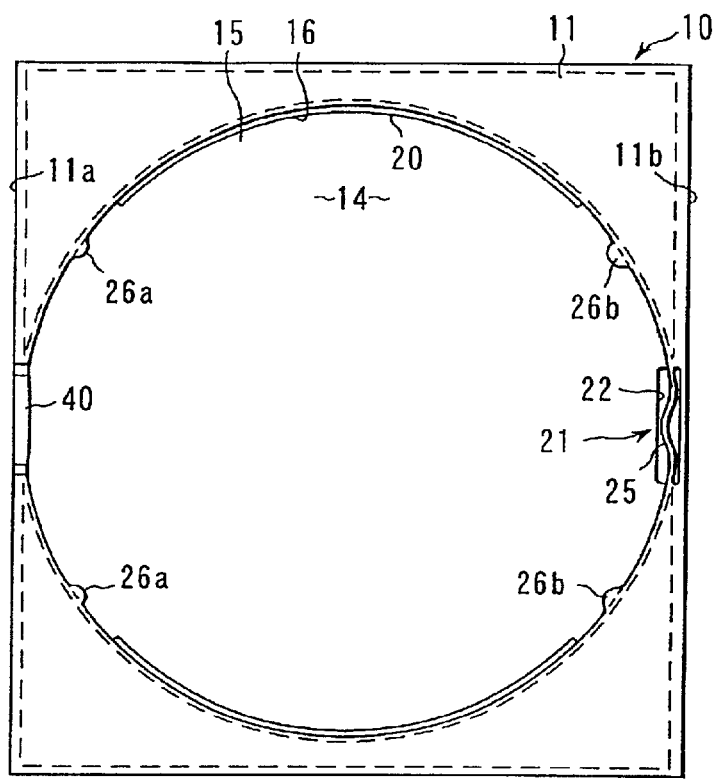
FIG. 19 is a plan view of a disc case according to a tenth embodiment of the present invention.

FIG. 19 shows a disc case 10 according to a tenth embodiment of the present invention. This disc case 10 is provided with a pair of retaining protuberances 26a near the opening 40. A spring portion 21 is formed opposed to the opening 40. A pair of retaining protuberances 26b is formed near the spring portion 21. The protuberances 26a closer to the opening 40 are smaller than the protuberances 26b located near the spring portion 21.

Figure 20:
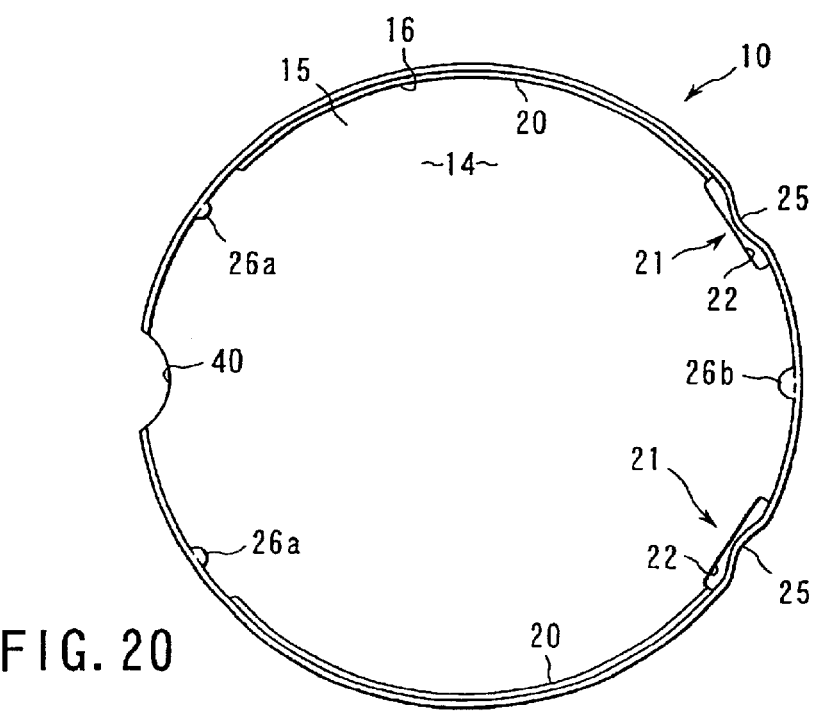
FIG. 20 is a plan view of a disc case according to an eleventh embodiment of the present invention.

FIG. 20 shows a disc case 10 according to an eleventh embodiment of the present invention. This disc case 10 is provided with a pair of protuberance 26a near the opening 40. A protuberance 26b is formed opposed to the opening 40. A pair of spring portions 21 is formed near the protuberance 26b. Like the protuberances 26 of the aforesaid embodiments, the protuberances 26a and 26b are overhanging so as to prevent the disc from slipping out of the recess 14.

In connection with the foregoing embodiments, the trays having the recess 14 with an elliptic or oval plane shape have been described as preferred examples. However, the present invention is also applicable to trays with various other shapes. It is to be understood that the invention is applicable to a disc case using a tray that has a substantially perfectly circular recess, for example.

In carrying out the present invention, the material and transparency of the trays may be selected freely, and in short, it is necessary only that the trays be shaped corresponding to media discs to be stored therein. It is to be understood that the respective configurations of the spring elements, protuberances, etc. and the number and location of the spring portions, as well as the respective configurations of the recess and the disc supporting portion(s), may be suitably changed or modified by one skilled in the art without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disc case with a tray and an openable and closable lid attached to the tray, comprising:

a disc storage recess formed in the tray, said recess having a non-circular elliptical or oval shape having a major axis extending in a surface direction of the disc and a minor axis extending in a surface direction of the disc at right angles to the major axis;

a disc supporting portion formed on a peripheral wall portion of the recess and capable of supporting the outer peripheral portion of the disc in a manner such that the recording surface of the disc is floating;

a plurality of spring portions provided on the peripheral wall portion of the tray in the circumferential direction thereof, each of said spring portions including a spring element adapted to urge the outer peripheral portion of the disc in a diametrical direction of the disc, thereby bending the spring element in a direction to allow insertion of the disc into the recess, as the disc is inserted into the recess;

a protuberance that projects into the recess for preventing the disc from slipping out of the recess; and a lug formed in the lid, said lug contacting the outer peripheral portion of the disc stored in the recess when the lid is closed.

2. A disc case according to claim 1, wherein said tray in formed having a plurality of slots extending in the circumferential direction of the peripheral wall portion, and each of said spring elements extend adjacent a corresponding one of the plurality of slots between the opposite ends thereof and are formed integrally with the tray, each of said spring elements being integrally formed with the protuberance and peripheral wall.

3. A disc case according to claim 1, wherein said recess is shaped along a non-circular ellipse or oval having a major axis extending in a direction in which the spring elements can bend and a minor axis extending at right angles to the major axis.

4. A disc case according to claim 1, wherein said tray is formed having, in a side portion thereof, an opening communicating with the recess and serving to enable a user to touch the outer peripheral portion of the disc with his/her finger as the user takes out the disc from the recess.

5. A disc case according to claim 3, wherein said tray is formed having, in a side portion thereof, an opening communicating with the recess and serving to enable a user to touch the outer peripheral portion of the disc with his/her finger as the user takes out the disc from the recess.

6. A disc case according to claim 5, wherein some of the plurality of spring portions are more remote from the opening than the remaining plurality of spring portions and have a shape such that the spring portions can bend deeper in the diametrical direction of the disc than those remaining spring portions which are situated near the opening can.

7. A disc case according to claim 6, wherein each of said plurality of spring portions has a protuberance, and the protuberances of the spring portions that are remote from the opening are larger than the respective protuberances of the remaining spring portions.

8. A disc case according to claim 1, wherein said tray is formed of an optically transparent synthetic resin and is provided, in the backside thereof, with printed matter printed with a picture(s), pattern(s), and/or character(s).

9. A disc case with a tray and an openable and closable lid attached to the tray, comprising:
   a disc storage recess formed in the tray, said recess having a non-circular elliptical shape having a major axis extending in a surface direction of the disc and a minor axis extending in a surface direction of the disc at right angles to the major axis;
   a disc supporting portion formed on a peripheral wall portion of the recess and capable of supporting the outer peripheral portion of the disc in a manner such that the recording surface of the disc is floating;
   a plurality of spring portions provided on the peripheral wall portion of the tray in the circumferential direction thereof, each of said spring portions including a spring element adapted to urge the outer peripheral portion of the disc in a diametrical direction of the disc, thereby bending the spring element in a direction to allow insertion of the disc into the recess, as the disc is inserted into the recess;
   a protuberance for preventing the disc from slipping out of the recess; and
   a lug formed in the lid, said lug contacting the outer peripheral portion of the disc stored in the recess when the lid is closed;
   wherein said recess is shaped along a non-circular ellipse having a major axis extending in a first direction and a minor axis extending perpendicular to the major axis;
   wherein said tray is formed having, in a side portion thereof, an opening communicating with the recess and serving to enable a user to touch the outer peripheral portion of the disc with his/her finger as the user takes out the disc from the recess; and
   wherein the opening is formed on the major axis.

10. A disc case according to claim 9, wherein said tray is formed having a plurality of slots extending in the circumferential direction of the peripheral wall portion, and each of said spring elements extend adjacent a corresponding one of the plurality of slots between the opposite ends thereof and are formed integrally with the tray, each of said spring elements being integrally formed with the protuberance and peripheral wall.

11. A disc case according to claim 9, wherein some of the plurality of the spring portions are more remote from the opening than the remaining plurality of spring portions and have a shape such that the spring portions can bend deeper in the diametrical direction of the disc than those remaining spring portions which are situated near the opening can.

12. A disc case according to claim 9, wherein said tray is formed of an optically transparent synthetic resin and is provided, in the backside thereof, with printed matter printed with a picture(s), pattern(s), and/or character(s).

13. A disc case according to claim 9 wherein the opening is formed adjacent to the plurality of spring portions.

14. The tray of claim 9 wherein each spring element extends from the circumferential wall portion at either of two ends of each of the spring portions.

* * * * *